US009273593B2

(12) United States Patent
Sato

(10) Patent No.: US 9,273,593 B2
(45) Date of Patent: Mar. 1, 2016

(54) CONTROL APPARATUS FOR INTERNAL COMBUSTION ENGINE

(75) Inventor: Akira Sato, Gotenba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 225 days.

(21) Appl. No.: 13/885,709

(22) PCT Filed: Dec. 24, 2010

(86) PCT No.: PCT/JP2010/073424
§ 371 (c)(1),
(2), (4) Date: May 16, 2013

(87) PCT Pub. No.: WO2012/086078
PCT Pub. Date: Jun. 28, 2012

(65) Prior Publication Data
US 2013/0283783 A1    Oct. 31, 2013

(51) Int. Cl.
*F02D 23/00*    (2006.01)
*F02B 37/00*    (2006.01)
*F01N 3/08*    (2006.01)
(Continued)

(52) U.S. Cl.
CPC .............. *F02B 37/00* (2013.01); *F01N 3/0864* (2013.01); *F02B 37/18* (2013.01); *F02B 39/10* (2013.01); *F02D 41/0007* (2013.01); *F02D 41/0235* (2013.01); *F02D 41/1456* (2013.01); *F01N 11/00* (2013.01); *F01N 2430/06* (2013.01); *F01N 2550/02* (2013.01); *F01N 2560/025* (2013.01); *F02D 41/1475* (2013.01); *F02D 2200/0816* (2013.01); *Y02T 10/144* (2013.01); *Y02T 10/20* (2013.01)

(58) Field of Classification Search
CPC ....... F02B 37/18; F02B 37/00; Y02T 10/144; Y02T 10/24; Y02T 10/40; Y02T 10/12; Y02T 10/20; F01N 11/00; F01N 3/2066; F01N 2430/06; F01N 2550/00; F01N 2550/02; F01N 2550/03; F02D 41/0007; F02D 41/1454; F02D 41/1463; F02D 2200/0816
USPC .................... 60/274, 286, 299, 598; 123/703; 423/213.2, 213.5; 701/103
See application file for complete search history.

(56) References Cited

U.S. PATENT DOCUMENTS

2011/0058999 A1*    3/2011    Ettireddy et al. .......... 423/213.5
2011/0126812 A1*    6/2011    Miyashita ..................... 123/703

FOREIGN PATENT DOCUMENTS

JP    2010-159701    7/2010
JP    2010-180717    8/2010
(Continued)

*Primary Examiner* — Jesse Bogue
*Assistant Examiner* — Thomas Olszewski
(74) *Attorney, Agent, or Firm* — Finnegan, Henderson, Farabow, Garrett & Dunner, LLP

(57) ABSTRACT

An ECU alternatively changes a target air-fuel ratio At to a rich side and a lean side by active air-fuel ratio control. The ECU measures an oxygen storage capacity OSC of an exhaust purification catalyst based on an oscillation period of the target air-fuel ratio At and the target aft-fuel ratio At, and executes a deterioration determination with respect to the exhaust purification catalyst based on the measurement value. When executing the deterioration determination, the ECU closes a waste gate valve to prevent a decrease in the accuracy of the deterioration determination that is caused by two kinds of exhaust gas whose flow paths are different from each other arriving at the area surrounding an air-fuel ratio sensor.

4 Claims, 7 Drawing Sheets

(51) Int. Cl.
*F02B 37/18* (2006.01)
*F02B 39/10* (2006.01)
*F02D 41/02* (2006.01)
*F02D 41/14* (2006.01)
*F02D 41/00* (2006.01)
*F01N 11/00* (2006.01)

(56) References Cited

FOREIGN PATENT DOCUMENTS

| JP | 2010-185371 | 8/2010 |
| WO | WO 2010/058461 A1 | 5/2010 |

* cited by examiner

CONTROL APPARATUS FOR INTERNAL COMBUSTION ENGINE

CROSS-REFERENCE TO RELATED APPLICATIONS

This application is a national phase application of International Application No. PCT/JP2010/073424, filed Dec. 24, 2010, the content of which is incorporated herein by reference.

TECHNICAL FIELD

The present invention relates to a control apparatus for an internal combustion engine that includes a turbo-supercharger that is favorably used, for example, as a vehicle engine.

BACKGROUND ART

As the conventional technology, a control apparatus for an internal combustion engine that has a configuration that performs a deterioration determination with respect to a catalyst while executing so-called "active air-fuel ratio control" is known, as disclosed, for example, in Patent Literature 1 (Japanese Patent Laid-Open No. 2010-159701). According to the conventional technology, the control apparatus measures an oxygen storage capacity (OSC) of a catalyst while causing the actual air-fuel ratio to track a target air-fuel ratio by changing the actual air-fuel ratio to a rich side and a lean side by active air-fuel ratio control. Further, the control apparatus is configured so as to correct a measurement value of the OSC based on a deviation between the actual air-fuel ratio and the target air-fuel ratio, and determine deterioration of the catalyst based on the OSC measurement value after the correction.

The applicants are aware of the following literature, which includes the above described literature, as literature related to the present invention.

CITATION LIST

Patent Literature

Patent Literature 1: Japanese Patent Laid-Open No. 2010-459701
Patent Literature 2: Japanese Patent Laid-Open No, 2010-480717
Patent Literature 3: Japanese Patent Laid-Open No, 2010-485371

SUMMARY OF INVENTION

Technical Problem

According to the conventional technology, there are cases where it is desired to adopt the above described catalyst deterioration determination in an internal combustion engine that includes a turbo-supercharger. However, in the case of an internal combustion engine with a turbo, normally, a turbine and a waste gate valve (WGV) are arranged in parallel on an upstream side of a catalyst. With such a structure, a difference is liable to arise between the characteristics of exhaust gas that passed through the turbine and the characteristics of exhaust gas that passed through the WGV. That is, exhaust gas that passed through the turbine arrives at an A/F sensor arranged in front of the catalyst in a state in which the exhaust gas has been agitated by the turbine. Therefore, in comparison to exhaust gas that passed through the WGV, exhaust gas that passed through the turbine is liable to diffuse over a wide area at the position of the A/F sensor, and the exhaust gas that passed through the turbine also has a characteristic that fluctuations in the A/F ratio are small.

Accordingly, when a ratio between exhaust gas that passes through a turbine and exhaust gas that passes through a WGV changes in response to a change in the degree of opening of the WGV, the actual air-fuel ratio that is detected by the A/F sensor is liable to fluctuate in accompaniment therewith. Consequently, when it is attempted to merely apply the catalyst deterioration determination of the conventional technology to an internal combustion engine with a turbo, there is the problem that the actual air-fuel ratio fluctuates depending on the degree of opening of the WGV, and an error may arise in a calculation value of the OSC, which leads to a decrease in the determination accuracy or an erroneous determination.

The present invention has been conceived to solve the above described problems, and an object of the present invention is to provide a control apparatus for an internal combustion engine that can accurately determine deterioration of a catalyst and improve reliability in an internal combustion engine with a turbo also.

Means for Solving the Problem

A first aspect of the present invention is a control apparatus for an internal combustion engine, comprising:
an exhaust purification catalyst that is provided in an exhaust passage of the internal combustion engine and that has an oxygen storage capability;
a turbo-supercharger that has a turbine that is provided in the exhaust passage on an upstream side of the exhaust purification catalyst, and that supercharges intake air utilizing an exhaust pressure;
a bypass passage that branches from the exhaust passage on an upstream side of the turbine, and bypasses the turbine and merges with the exhaust passage on the upstream side of the exhaust purification catalyst;
a waste gate valve that adjusts an amount of exhaust gas that flows through the bypass passage;
air-fuel ratio detection means that is arranged on a downstream side of a merging position where the exhaust passage and the bypass passage merge, and that detects an air-fuel ratio in a vicinity of the exhaust purification catalyst;
active air-fuel ratio control means that alternately changes a target air-fuel ratio to a rich side and a lean side around a theoretical air-fuel ratio, and controls an actual air-fuel ratio that is detected by the air-fuel ratio detection means so that the actual air-fuel ratio matches the target air-fuel ratio;
deterioration determination means that measures an oxygen storage capacity of the exhaust purification catalyst based on the target air-fuel ratio and the actual air-fuel ratio in a state in which the actual air-fuel ratio is controlled by the active air-fuel ratio control means, and determines deterioration of the exhaust purification catalyst by comparing a relevant measurement value with a predetermined deterioration determination value; and
determination-time valve closing means that closes the waste gate valve when executing a deterioration determination by means of the deterioration determination means.

In a second aspect of the present invention, a control apparatus for an internal combustion engine, comprising:
an exhaust purification catalyst that is provided in an exhaust passage of the internal combustion engine and that has an oxygen storage capability;

a turbo-supercharger that has a turbine that is provided in the exhaust passage on an upstream side of the exhaust purification catalyst, and that supercharges intake air utilizing an exhaust pressure;

a bypass passage that branches from the exhaust passage on an upstream side of the turbine, and bypasses the turbine and merges with the exhaust passage on the upstream side of the exhaust purification catalyst;

a waste gate valve that adjusts an amount of exhaust gas that flows through the bypass passage;

air-fuel ratio detection means that is arranged on a downstream side of a merging position where the exhaust passage and the bypass passage merge, and that detects an air-fuel ratio in a vicinity of the exhaust purification catalyst;

active air-fuel ratio control means that alternately changes a target air-fuel ratio to a rich side and a lean side around a theoretical air-fuel ratio, and controls an actual air-fuel ratio that is detected by the air-fuel ratio detection means so that the actual air-fuel ratio matches the target air-fuel ratio;

deterioration determination means that measures an oxygen storage capacity of the exhaust purification catalyst based on the target air-fuel ratio and the actual air-fuel ratio in a state in which the actual air-fuel ratio is controlled by the active air-fuel ratio control means, and determines deterioration of the exhaust purification catalyst by comparing a relevant measurement value with a predetermined deterioration determination value; and amplitude correction means that, when executing a deterioration determination by means of the deterioration determination means, corrects an oscillation width of the target air-fuel ratio around the theoretical air-fuel ratio based on a degree of opening of the waste gate valve.

In a third aspect of the present invention, wherein the amplitude correction means is configured to decrease the oscillation width of the target air-fuel ratio as the degree of opening of the waste gate valve decreases.

In a fourth aspect of the present invention, a control apparatus for an internal combustion engine, comprising:

an exhaust purification catalyst that is provided in an exhaust passage of the internal combustion engine and that has an oxygen storage capability;

a turbo-supercharger that has a turbine that is provided in the exhaust passage on an upstream side of the exhaust purification catalyst, and that supercharges intake air utilizing an exhaust pressure;

a bypass passage that branches from the exhaust passage on an upstream side of the turbine, and bypasses the turbine and merges with the exhaust passage on the upstream side of the exhaust purification catalyst;

a waste gate valve that adjusts an amount of exhaust gas that flows through the bypass passage;

air-fuel ratio detection means that is arranged on a downstream side of a merging position where the exhaust passage and the bypass passage merge, and that detects fuel ratio in a vicinity of the exhaust purification catalyst;

active air-fuel ratio control means that alternately changes a target air-fuel ratio to a rich side and a lean side around a theoretical air-fuel ratio, and controls an actual air-fuel ratio that is detected by the air-fuel ratio detection means so that the actual air-fuel ratio matches the target air-fuel ratio;

deterioration determination means that measures an oxygen storage capacity of the exhaust purification catalyst based on the target air-fuel ratio and the actual air-fuel ratio in a state in which the actual air-fuel ratio is controlled by the active air-fuel ratio control means, and determines deterioration of the exhaust purification catalyst by comparing a relevant measurement value with a predetermined deterioration determination value; and determination value correction means that, when executing a deterioration determination by means of the deterioration determination means, corrects the deterioration determination value based on a degree of opening of the waste gate valve.

In a fifth aspect of the present invention, wherein the determination value correction means is configured to decrease the deterioration determination value as the degree of opening of the waste gate valve decreases.

Advantageous Effects of Invention

According to the first invention, when determining deterioration of an exhaust purification catalyst, a bypass passage can be blocked by determination-time valve closing means so that only exhaust gas that has passed through a turbine of a turbo-supercharger is allowed to reach the vicinity of air-fuel ratio detection means. As a result, the flow of exhaust gas and fluctuations in the air-fuel ratio can be always stabilized in the area surrounding the air-fuel ratio detection means without being affected by an operating state of a waste gate valve. Accordingly, in an engine with a turbo also, deterioration of a catalyst can be accurately determined and a decrease in the determination accuracy and an erroneous determination can be avoided, and the reliability can be improved.

According to the second invention, when measuring the oxygen storage capacity, the influence of the degree of opening of the waste gate valve on a measurement value can be compensated for by amplitude correction means. That is, the oxygen storage capacity can be stably measured under fixed conditions without being affected by changes in the degree of opening of the waste gate valve, and an accurate measurement value can be obtained. Therefore, in an engine with a turbo also, deterioration of a catalyst can be accurately determined and a decrease in the determination accuracy and an erroneous determination can be avoided. In addition, when measuring the oxygen storage capacity, since it is not necessary to stop normal supercharging control or the like and forcibly change the degree of opening of the waste gate valve, drivability can be enhanced. Furthermore, when an oscillation width of a target air-fuel ratio is corrected in a decreasing direction, exhaust emissions can be improved.

According to the third invention, the amplitude correction means can decrease the oscillation width of the target air-fuel ratio in accordance with a decrease in the degree of opening of the waste gate valve. Since a measurement value of the oxygen storage capacity has a characteristic such that the measurement value increases as the degree of opening of the waste gate valve decreases, the aforementioned deviation in the measurement value can be cancelled out by decreasing the oscillation width when the degree of opening is small.

According to the fourth invention, when measuring the oxygen storage capacity OSC, even if a change in the degree of opening of the waste gate valve acts as a disturbance, the influence of the change on a measurement value can be compensated for by determination value correction means. As a result, the oxygen storage capacity OSC can be stably measured under fixed conditions, and a signal-to-noise ratio of the measurement value with respect to the disturbance can be improved. Therefore, in an engine with a turbo also, deterioration of a catalyst can be accurately determined and a decrease in the determination accuracy and an erroneous determination can be avoided.

According to the fifth invention, the determination value correction means can decrease a deterioration determination value in accordance with a decrease in the degree of opening of the waste gate valve. It is thereby possible to prevent an erroneous determination caused by a measurement value that deviates from a true value due to the influence of a disturbance.

DESCRIPTION OF EMBODIMENTS

Embodiment 1

[Configuration of Embodiment 1]

Figure 1:
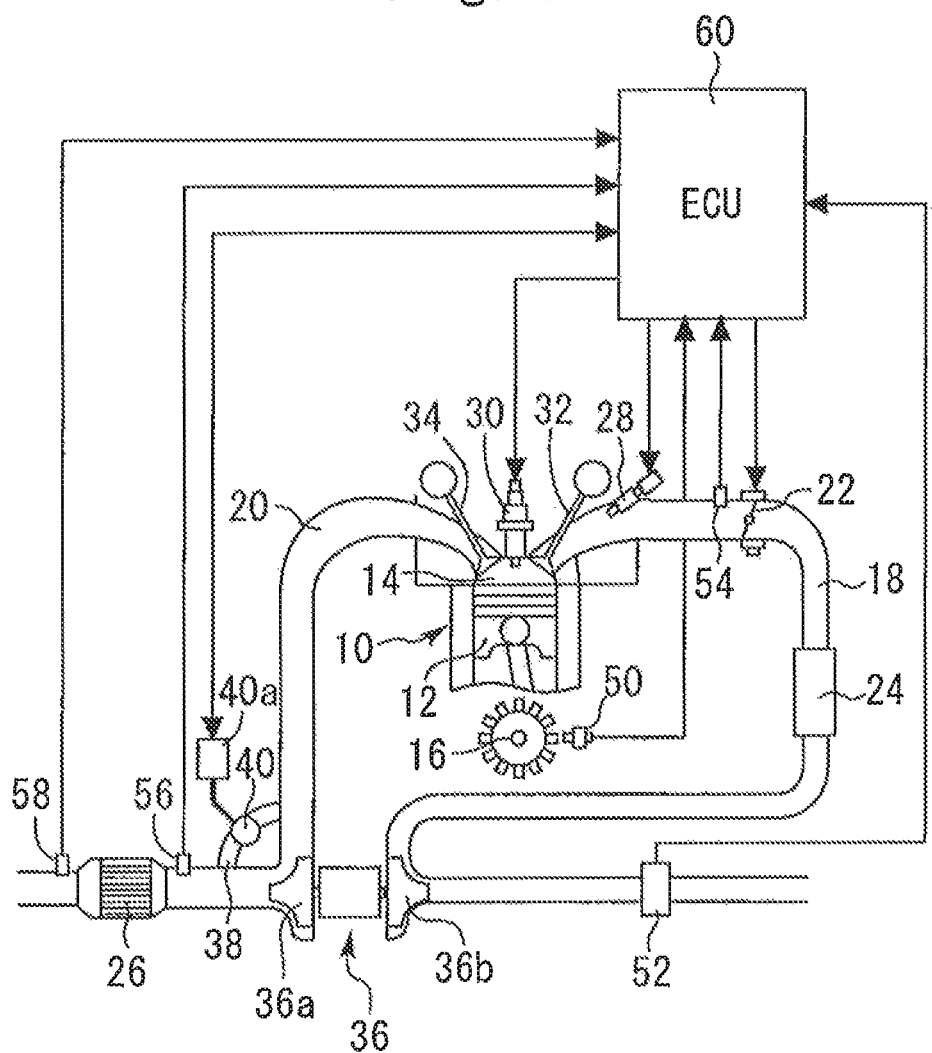
FIG. 1 is an overall configuration diagram for describing the system configuration of Embodiment 1 of the present invention.
Figure 4:
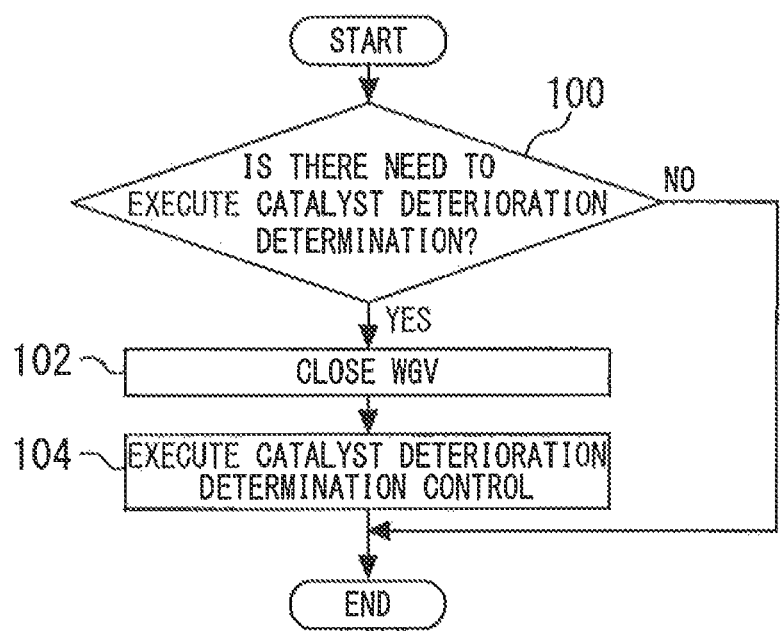
FIG. 4 is a flowchart that illustrates control executed by the ECU according to Embodiment 1 of the present invention.

Hereunder, Embodiment 1 of the present invention is described while referring to FIGS. 1 and 4. FIG. 1 is an overall configuration diagram for describing the system configuration of Embodiment 1 of the present invention. The system of the present embodiment includes an engine 10 as an internal combustion engine. A combustion chamber 14 is defined by a piston 12 in each cylinder of the engine 10. Each piston 12 is connected to a crankshaft 16 of the engine 10. The engine 10 also includes an intake passage 18 that draws intake air into each cylinder, and an exhaust passage 20 through which exhaust gas is discharged from each cylinder. An electronically controlled throttle valve 22 that adjusts an intake air amount and an intercooler 24 that cools intake air are provided in the intake passage 18.

An exhaust purification catalyst 26 that purifies exhaust gas is provided in the exhaust passage 20. The exhaust purification catalyst 26 is composed by a three-way catalyst or the like and, for example, includes an oxygen storage component such as cerium dioxide ($CeO_2$) or zirconia. That is, the exhaust passage 20 has an oxygen storage capability for storing and discharging oxygen in exhaust gas. Each cylinder is provided with a fuel injection valve 28 that injects fuel into an intake port, a spark plug 30 that ignites an air-fuel mixture in the cylinder, an intake valve 32 that opens and closes the intake port with respect to the inside of the cylinder, and an exhaust valve 34 that opens and closes an exhaust port with respect to the inside of the cylinder.

The engine 10 also includes a known turbo-supercharger 36 that supercharges intake air utilizing an exhaust pressure. The turbo-supercharger 36 is constituted by a turbine 36a that is provided in the exhaust passage 20 on an upstream side of the exhaust purification catalyst 26, and a compressor 36b that is provided in the intake passage 18. When the turbo-supercharger 36 operates, the turbine 36a receives an exhaust pressure and drives the compressor 36b, and as a result the compressor 36b supercharges intake air. A bypass passage 38 that bypasses the turbine 36a, and a waste gate valve (WGV) 40 that adjusts the amount of exhaust gas flowing through the bypass passage 38 are also provided in the exhaust passage 20.

The bypass passage 38 branches from the exhaust passage 20 on the upstream side of the turbine 36a, and then merges with the exhaust passage 20 at a position that is on the downstream side of the turbine 36a and on the upstream side of the exhaust purification catalyst 26. The WGV 40 opens and closes the bypass passage 38 to thereby adjust the amount of exhaust gas that flows through the bypass passage 38 in accordance with the degree of opening thereof, and includes an actuator 40a. The actuator 40a is configured so as to drive the WGV 40 by means of an intake pressure or electric power based on a control signal that is input from an ECU 60 that is described later.

Next, a control system of the engine will be described. The system according to the present embodiment includes a sensor system that includes sensors 50 to 58, and an ECU (Electronic Control Unit) 60 that controls the operating state of the engine 10. First, the sensor system will be described. A crank angle sensor 50 outputs a signal that is synchronous with rotation of the crankshaft 16. An airflow sensor 52 detects an intake air amount of the engine. Further, an intake air pressure sensor 54 detects an intake air pressure (supercharging pressure) inside the intake passage 18.

An air-fuel ratio sensor 56 detects an air-fuel ratio in the vicinity of the exhaust purification catalyst 26, and constitutes air-fuel ratio detection means of the present embodiment. A known sensor that is capable of continuously detecting an air-fuel ratio and that outputs a signal that is proportional to the air-fuel ratio is used as the air-fuel ratio sensor 56. The air-fuel ratio sensor 56 is arranged at a position that is on a downstream side of a position where the exhaust passage 20 and the bypass passage 38 merge and on an upstream side of the exhaust purification catalyst 26. An oxygen concentration sensor 58 detects an oxygen concentration in exhaust gas on a downstream side of the exhaust purification catalyst 26, and has a characteristic (Z characteristic) such that an output value thereof changes suddenly between a rich side and a lean side that take a theoretical air-fuel ratio as a boundary therebetween.

In addition to these sensors, the sensor system includes various sensors that are required to control the engine 10 or the vehicle (for example, a water temperature sensor that detects a temperature of the engine cooling water, and an accelerator sensor that detects an accelerator operation amount of a driver). These sensors are connected to an input side of the ECU 60. Further, various actuators including the throttle valve 22, the fuel injection valve 28, the spark plug 30, and the actuator 40a of the WGV 40 are connected to an output side of the ECU 60.

The ECU 60 is constituted, for example, by an arithmetic processing apparatus that includes a storage circuit such as a ROM or a RAM and an input/output port. The ECU 60 controls the operation of the engine by driving each actuator based on operating information of the engine that is detected by the sensor system. More specifically, the ECU 60 detects the number of engine revolutions and the crank angle based on the output of the crank angle sensor 50, and calculates a load based on an intake air amount that is detected by the airflow sensor 52 and the number of engine revolutions. The ECU 60 also calculates a fuel injection amount based on the number of engine revolutions, the load and the like, and decides the fuel injection timing and the ignition timing based on the crank angle. In each cylinder, the ECU 60 drives the fuel injection valve 28 at a time point at which a fuel injection timing has been reached, and drives the spark plug 30 at a time point at which an ignition timing has been reached. Thus, an air-fuel mixture inside each cylinder can be combusted to operate the engine 10.

The ECU 60 also executes supercharging pressure control that controls the supercharging pressure in accordance with the operating state of the engine. According to the supercharging pressure control, the amount of exhaust gas that passes through the turbine 36a of the turbo-supercharger 36 is adjusted by changing the degree of opening of the WGV 40. In addition, the ECU 60 executes active air-fuel ratio control and catalyst deterioration determination control that are described hereunder. These controls are described, for example, in Japanese Patent Laid-Open No, 2010-159701.

(Active Air-Fuel Ratio Control)

According to this control, first, the ECU 60 alternately changes a target air-fuel ratio At to a rich side and a lean side around a theoretical air-fuel ratio (stoichiometric ratio). As a result, the target air-fuel ratio At oscillates in a rectangular shape (crank shape) to the rich side and lean side around the stoichiometric ratio. The ECU 60 then controls an actual air-fuel ratio Ar (fuel injection mount) that is detected by the air-fuel ratio sensor 56 so that the actual air-fuel ratio Ar matches the target air-fuel ratio At that oscillates in this manner. As a result, the actual air-fuel ratio Ar oscillates with a slight time lag relative to the target air-fuel ratio At. Further, in the active air-fuel ratio control, the target air-fuel ratio At is switched at a timing that reflects an output of the oxygen concentration sensor 58 that is arranged on the downstream side of the exhaust purification catalyst 26.

More specifically, for example, when the target air-fuel ratio At has been set to the lean side, the actual air-fuel ratio Ar also changes to the lean side to track the target air-fuel ratio At, and hence lean gas is supplied to the exhaust purification catalyst 26. In this case, in a state in which the oxygen storage capability of the catalyst 26 is not saturated, since oxygen in the lean gas is stored in the catalyst 26, the air-fuel ratio on the downstream side of the catalyst is maintained at approximately the stoichiometric ratio, and the output of the oxygen concentration sensor 58 is maintained at the output value (rich side) that was inverted to immediately prior thereto. However, as time passes and the oxygen storage capability of the catalyst 26 saturates, lean gas flows out to the downstream side of the catalyst 26, and hence the output of the oxygen concentration sensor 58 inverts to the lean side. The target air-fuel ratio At is switched to the rich side from the lean side at the time point at which this inversion of the output is detected.

On the other hand, when the target air-fuel ratio At is switched to the rich side, although rich gas is supplied to the catalyst 26, during a period in which oxygen is being discharged from the catalyst 26 into the rich gas, the air-fuel ratio on the downstream side of the catalyst is maintained at approximately the stoichiometric ratio and the output of the oxygen concentration sensor 58 is maintained on the lean side. Subsequently, when discharge of the oxygen of the catalyst 26 is completed, rich gas flows out to the downstream side of the catalyst 26 and consequently the output of the oxygen concentration sensor 58 inverts to the rich side. Therefore, according to the active air fuel ratio control, the length of an oscillation period of the target air-fuel ratio At depends on the oxygen storage capability of the exhaust purification catalyst 26, and shortens as the oxygen storage capability decreases.

(Catalyst Deterioration Determination Control)

This control determines the degree of deterioration of the exhaust purification catalyst 26 during execution of active air-fuel ratio control in a state in which the engine 10 is in a steady operational state and the exhaust purification catalyst 26 has been activated. In the catalyst deterioration determination control, first, an increment $\Delta OSC$ of the oxygen storage capacity is calculated by Equation (1) below. Note that, the term "increment $\Delta OSC$ of the oxygen storage capacity" refers to an oxygen storage capacity that is computed by the ECU 60 for each sampling period of the sensor output.

$$\Delta OSC = \Delta A \times Q \times K \tag{1}$$

In Equation (1) above, Q represents a fuel injection amount, and $\Delta A$ represents an air-fuel ratio deviation. The air-fuel ratio deviation $\Delta A$ is calculated as an absolute value of a difference between the actual air-fuel ratio Ar and a theoretical air-fuel ratio As ($\Delta A = |Ar - As|$). Further, K is a constant corresponding to the proportion of oxygen contained in the air.

In the next processing, in a rich period that is a period from when the target air fuel ratio At changes to the rich side until the target air-fuel ratio At returns to the lean side, or in a lean period from when the target air-fuel ratio At changes to the lean side until the target air-fuel ratio At returns to the rich side, the increments $\Delta OSC$ of the oxygen storage capacity during the relevant period are integrated, and the integrated value is calculated as a final oxygen storage capacity OSC. Note that, the mean of the oxygen storage capacity OSC during a rich period and the oxygen storage capacity OSC during a lean period may also be taken as the final oxygen storage capacity OSC.

In the next processing, the ECU 60 compares the final oxygen storage capacity OSC and a predetermined deterioration determination value S to thereby determine whether or not the exhaust purification catalyst 26 is deteriorating. In this processing, the oxygen storage capacity OSC is greater than the deterioration determination value S, the ECU 60 determines that the catalyst 26 is normal, while if the oxygen storage capacity OSC is less than or equal to the deterioration determination value S the ECU 60 determines that the catalyst 26 is deteriorating. Since the oxygen storage capacity of the catalyst 26 has a characteristic of decreasing as deterioration progresses, the degree of deterioration of the catalyst 26 can be determined by the above described determination processing.

Figure 2:
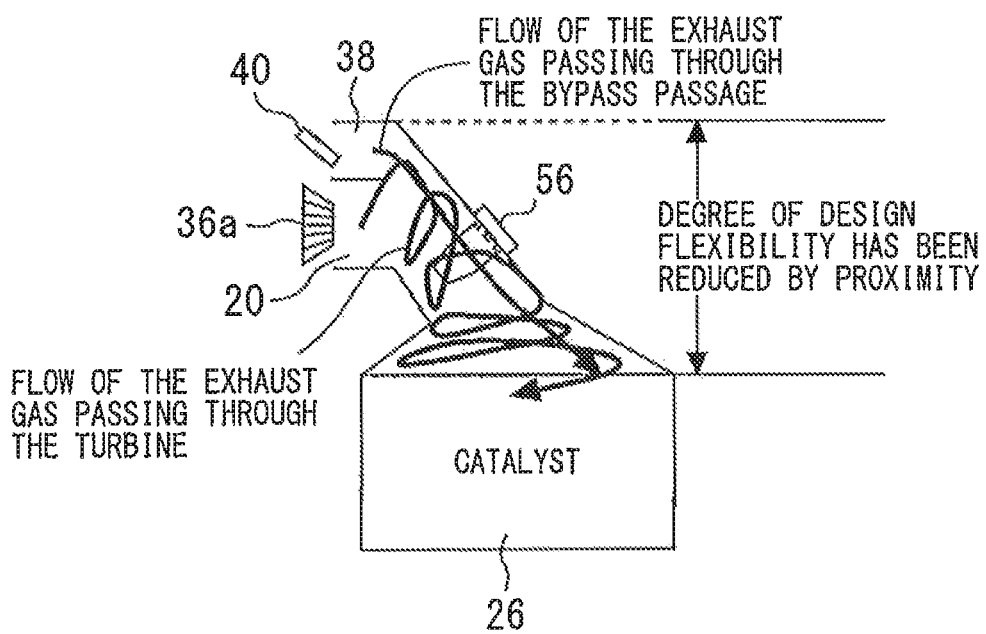
FIG. 2 is an explanatory drawing for describing a difference between the flow of exhaust gas that has passed through the turbine of the turbo-supercharger and the flow of exhaust gas that has passed through the bypass passage.
Figure 3:
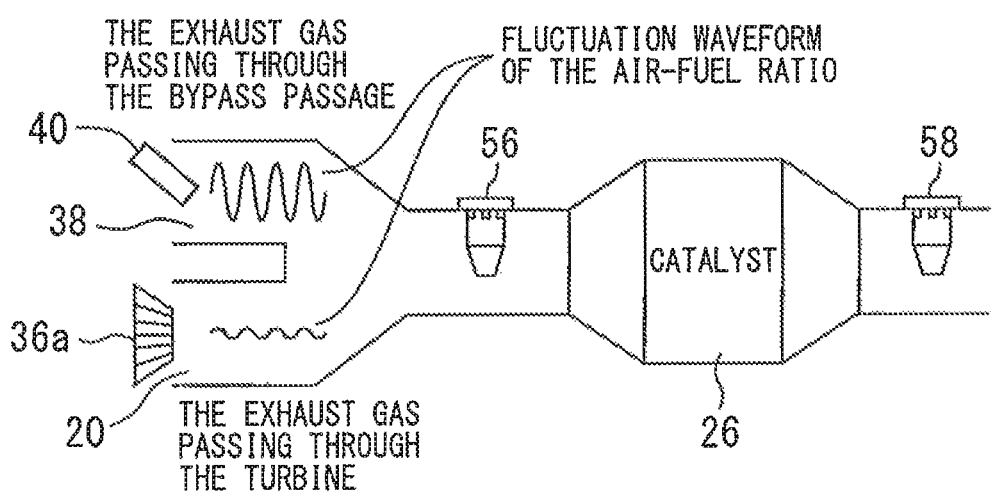
FIG. 3 is an explanatory drawing for describing a difference between air-fuel ratio fluctuations of these exhaust gases.

In the engine 10 that is equipped with a turbo, on the upstream side of the catalyst 26 (air-fuel ratio sensor 56), a part of the exhaust passage 20 and the bypass passage 38 are arranged in parallel with each other. Consequently, when executing supercharging control, some exhaust gas arrives at the catalyst 26 by passing through only the exhaust passage 20 (turbine 36a of the turbo-supercharger 36) and some exhaust gas arrives at the catalyst 26 by passing through the bypass passage 38. A difference in characteristics as described hereunder is liable to arise between these two kinds of exhaust gas. FIG. 2 is an explanatory drawing for describing a difference between the flow of exhaust gas that has passed through the turbine of the turbo-supercharger and the flow of exhaust gas that has passed through the bypass passage. FIG. 3 is an explanatory drawing for describing a difference between air-fuel ratio fluctuations of these exhaust gases.

As shown in FIG. 2, in recent years, to conform to emission requirements and the like, there is a tendency to arrange the exhaust purification catalyst 26 on the engine main body side, that is, close to the turbine 36a side to improve warm-up characteristics of the catalyst, and the degree of design flexibility has been reduced as a result of such proximity. According to this arrangement structure, since exhaust gas that has passed through the turbine 36a arrives at the air-fuel ratio sensor 56 immediately after being agitated by the turbine 36a, in comparison to the exhaust gas that has passed through the bypass passage 38, there is a tendency for the flow of the gas to be uniformized in the area surrounding the air-fuel ratio sensor 56.

Further, as shown in FIG. 3, in a state in which active air-fuel ratio control is being executed, a fluctuation waveform of the air-fuel ratio of exhaust gas that has passed through the bypass passage 38 is approximately equal to the case of a naturally aspirated engine. In contrast, in the case of exhaust gas that has passed through the turbine 36a, there is a tendency for vector directions of the exhaust motion to diverge, and hence the mount of fluctuation (oscillation width) of the air-fuel ratio tends to decrease. Accordingly, when a ratio between exhaust gas that passes through the turbine 36a and exhaust gas that passes through the bypass passage 38 changes in accordance with the degree of opening of the WGV 40, the actual air-fuel ratio Ar that is detected by the air-fuel ratio sensor 56 fluctuates and there is a risk that the determination accuracy of the catalyst deterioration determination control will decrease.

Therefore, according to the present embodiment a configuration is adopted that closes (preferably, fully closes) the WGV 40 when executing catalyst deterioration determination control. According to this configuration, when determining deterioration of the catalyst 26, it is possible to block the bypass passage 38 and thereby allow only exhaust gas that has passed through the turbine 36a to reach the area surrounding the air-fuel ratio sensor 56. As a result, in the area surrounding the air-fuel ratio sensor 56, the flow of exhaust gas and fluctuations in the air-fuel ratio can be always stabilized without being affected by supercharging control. In particular, since the exhaust gas that passed through the turbine 36a is uniformized in comparison to the exhaust gas that passed through the bypass passage 38, and fluctuations in the air-fuel ratio thereof are small, the oxygen storage capacity OSC measurement periods (the aforementioned rich period and lean period) can be lengthened. As a result, since a measurement value of the oxygen storage capacity OSC can be increased, a signal-to-noise ratio thereof can be improved and a stabilized measurement value can be obtained. Accordingly, in an engine with a turbo also, deterioration of the catalyst 26 can be accurately determined and a decrease in the determination accuracy and an erroneous determination can be avoided, and the reliability can be enhanced.

[Specific Processing to Realize Embodiment 1]

Next, specific processing to realize the above described control is described referring to FIG. 4. FIG. 4 is a flowchart that illustrates control executed by the ECU according to Embodiment 1 of the present invention. The routine shown in FIG. 4 is repeatedly executed during operation of the engine. According to the routine shown in FIG. 4, first, in step 100, the ECU 60 determines whether or not a need has arisen to perform a deterioration determination with respect to the exhaust purification catalyst 26. This need arises, for example, when a predetermined time has elapsed since the previous deterioration determination.

If a need to execute a deterioration determination has arisen, in step 102 the ECU 60 closes the WGV 40. Next, in step 104, the ECU 60 executes catalyst deterioration determination control while executing the above described active air-fuel ratio control. Further, after step 104 ends, a restriction on opening of the WGV 40 is released, and supercharging control is executed as necessary. Note that, in the above described Embodiment 1, step 102 in FIG. 4 shows a specific example of determination-time valve closing means according to claim 1, and step 104 in FIG. 4 shows a specific example of active air-fuel ratio control means and deterioration determination means.

Embodiment 2

Next, Embodiment 2 of the present invention is described with reference to FIG. 5 to FIG. 7. A feature of the present embodiment is that, with a similar configuration to that of the above described Embodiment 1, an oscillation width of a target air-fuel ratio is corrected when executing catalyst deterioration determination control. Note that, according to the present embodiment, components that are the same as in Embodiment 1 are denoted by the same reference symbols, and a description of such components is omitted.

[Features of Embodiment 2]

According to the present embodiment, when executing the catalyst deterioration determination control, correction control is executed with respect to the target air-fuel ratio without closing the WGV 40. In the correction control, the oscillation width of the target air-fuel ratio At that is controlled by active air-fuel ratio control is corrected on the basis of a degree of opening of the WGV 40 and an intake air amount. FIG. 5 shows data map for determining an oscillation width correction amount of a target air-fuel ratio based on a degree of opening of the WGV and an intake air amount according to Embodiment 2 of the present invention. Further, FIG. 6 is a timing chart that shows a state in which the oscillation width of the target air-fuel ratio is corrected. Note that a determination execution flag shown in FIG. 6 is a graph that is set when executing catalyst deterioration determination control.

Figure 5:
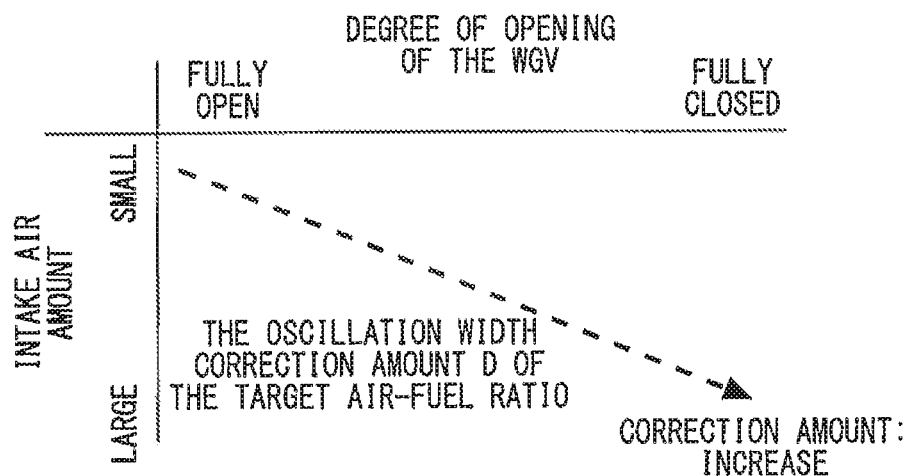
FIG. 5 shows data map for determining an oscillation width correction amount of a target air-fuel ratio based on a degree of opening of the WGV and an intake air amount according to Embodiment 2 of the present invention.
Figure 6:
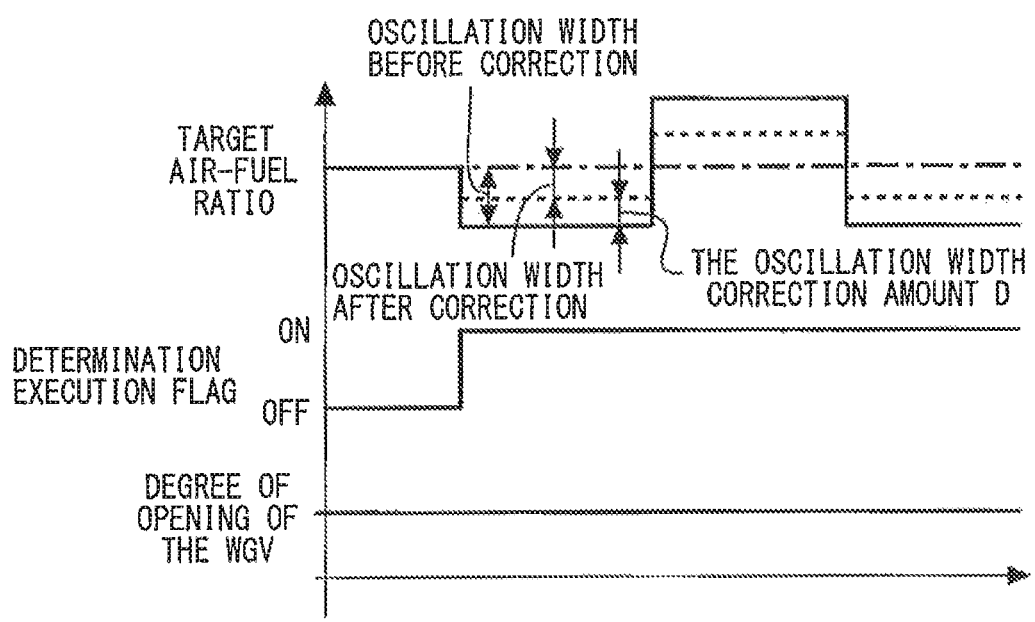
FIG. 6 is a timing chart that shows a state in which the oscillation width of the target air-fuel ratio is corrected.

In FIG. 5, an oscillation width correction amount D of the target air-fuel ratio is a correction amount that corrects an oscillation width (|At−As|) of the target air-fuel ratio At with respect to the theoretical air-fuel ratio As in a decreasing direction. That is, as shown in FIG. 6, an oscillation width of the target air-fuel ratio At decreases as the oscillation width correction amount D increases. In the target air-fuel ratio correction control, as shown in FIG. 5, the smaller that the degree of opening of the WGV 40 is, or the larger that the intake air amount of the engine is, the greater the degree to which the oscillation width correction amount D is increased and the oscillation width of the target air-fuel ratio is decreased. Note that, in the aforementioned correction control, for example, the oscillation width correction amount D is set by taking a state in which the WGV 40 is kept fully open and the intake air amount is a predetermined flow rate as a reference state. That is, the oscillation width correction amount D is set so as to be zero in the aforementioned reference state.

The following operational advantages can be obtained according to the above described target air-fuel ratio correction control. First, a measurement value of the oxygen storage capacity OSC that is measured by the catalyst deterioration determination control has a characteristic of increasing as the degree of opening of the WGV 40 decreases or the intake air amount increases. Further, as will be understood from the aforementioned calculation method, the measurement value increases as the oscillation width of the target air-fuel ratio At becomes larger. Therefore, according to the above described correction control, for example, in a case where the measurement value deviates in an increasing direction with respect to the reference state due to a change in the degree of opening of the WGV or the intake air amount, the oscillation width of the target air-fuel ratio At is decreased so as to cancel out the deviation.

Accordingly, when measuring the oxygen storage capacity OSC, the influence on a measurement value of a change in the degree of opening of the WGV or the intake air amount can be corrected by performing the correction control with respect to the target air-fuel ratio At. That is, the oxygen storage capacity OSC can be stably measured under fixed conditions (a reference state) without being affected by these changes and an accurate measurement value can be obtained. Consequently, in an engine with a turbo also, deterioration of the catalyst 26 can be accurately determined and a decrease in the determination accuracy and an erroneous determination can be avoided, and thus the reliability can be enhanced. In addition, according to the present embodiment, when measuring the oxygen storage capacity OSC, since it is not necessary to stop normal supercharging control and forcibly change the degree of opening of the WGV, drivability can be enhanced. Furthermore, when an oscillation width of the target air-fuel ratio At is corrected in a decreasing direction, the oscillation width of the actual air-fuel ratio Ar is decreased in accompaniment therewith and thus exhaust emissions at the time of deterioration detection can be improved.

[Specific Processing to Realize Embodiment 2]

Next, specific processing for implementing the above described control is described with reference to FIG. 7. FIG. 7 is a flowchart illustrating control that is executed by the ECU according to Embodiment 2 of the present invention. It is assumed that the routine shown in FIG. 7 is repeatedly executed during operation of the engine. According to the routine shown in FIG. 7, first, in step 200, similarly to Embodiment 1, the ECU 60 determines whether or not a need has arisen to execute a deterioration determination.

If a need to execute a deterioration determination has arisen, in step 202 the ECU 60 executes the catalyst deterioration determination control while executing the active air fuel ratio control. Next, in step 204, the ECU 60 reads in the degree of opening of the WGV 40 that is set by the supercharging control or the like, and an intake air amount detected by the airflow sensor 52. Subsequently, in step 206, by referring to the data shown in the aforementioned FIG. 5 based on these values that have been read, the ECU 60 calculates the oscillation width correction amount D of the target air-fuel ratio, and corrects the target air-fuel ratio At based on the calculated value.

Figure 7:
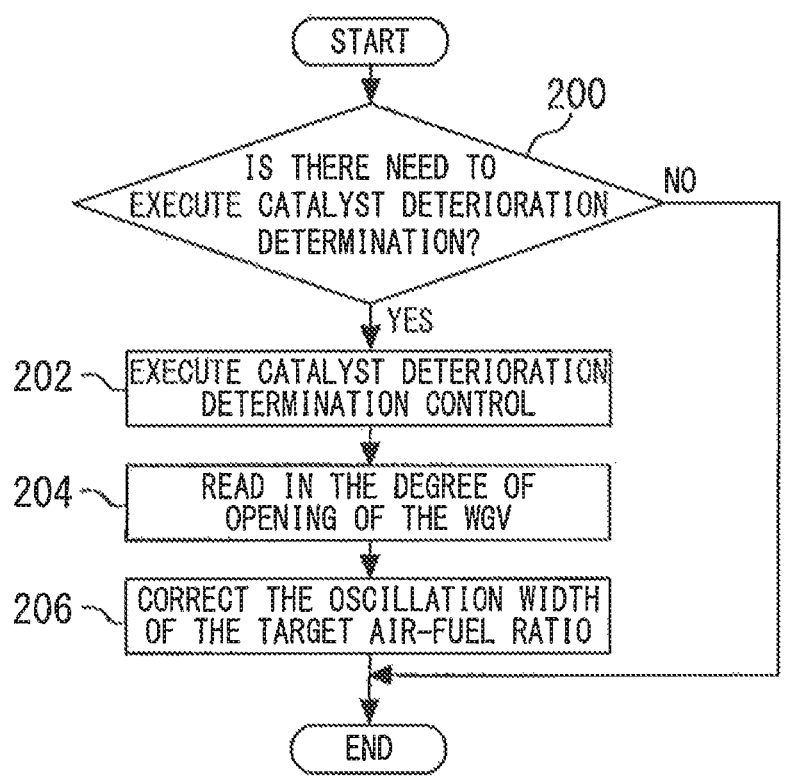
FIG. 7 is a flowchart illustrating control that is executed by the ECU according to Embodiment 2 of the present invention.

Note that, in the above described Embodiment 2, step 202 in FIG. 7 shows a specific example of active air-fuel ratio control means and deterioration determination means according to claim 2, and step 206 and FIG. 5 show a specific example of amplitude correction means according to claims 2 and 3.

Embodiment 3

Next, Embodiment 3 of the present invention is described with reference to FIG. 8 to FIG. 10. A feature of the present embodiment is that, with a similar configuration to the above described Embodiment 1, a deterioration determination value is corrected when executing catalyst deterioration determination control. Note that, according to the present embodiment, components that are the same as in Embodiment 1 are denoted by the same reference symbols, and a description of such components is omitted.

[Features of Embodiment 3]

According to the present embodiment, when executing the catalyst deterioration determination control, correction control is executed with respect to the deterioration determination value S without closing the WGV 40. In the correction control, the deterioration determination value S that is compared to a measurement value of the oxygen storage capacity OSC is corrected based on a degree of opening of the WGV 40 and an intake air amount. FIG. 8 is a data map for determining a correction amount of a deterioration determination value based on a degree of opening of the WGV and an intake air amount in Embodiment 3 of the present invention. Further, FIG. 9 is a timing chart that shows a state in which the deterioration determination value is corrected. Note that a determination execution flag shown in FIG. 9 is a graph that is set when executing catalyst deterioration determination control.

Figure 8:
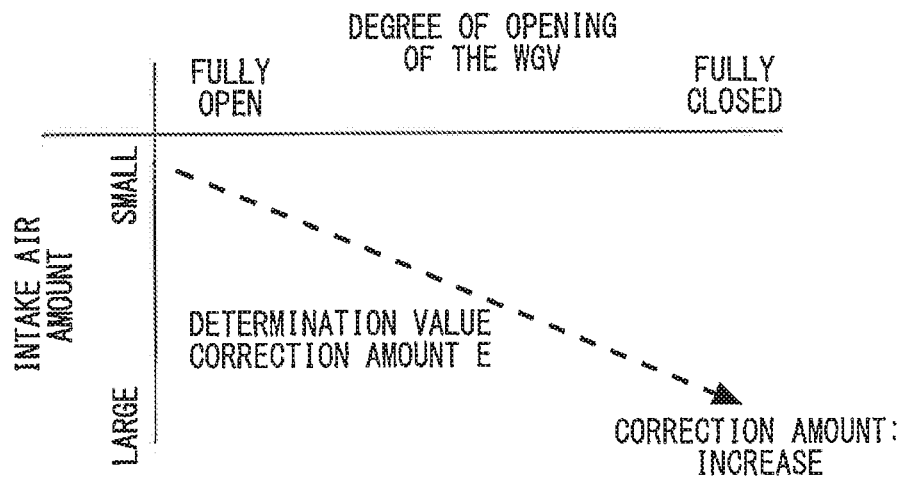
FIG. 8 is a data map for determining a correction amount of a deterioration determination value based on a degree of opening of the WGV and an intake air amount in Embodiment 3 of the present invention.
Figure 9:
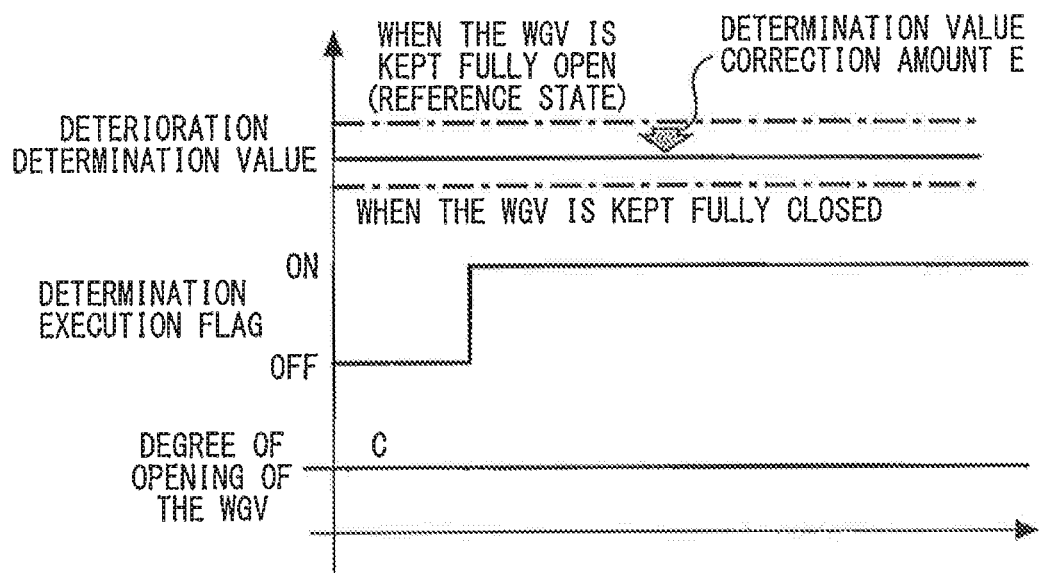
FIG. 9 is a timing chart that shows a state in which the deterioration determination value is corrected.

In FIG. 8, a determination value correction amount E is a correction amount that corrects the deterioration determination value S in a decreasing direction. As shown in FIG. 9, the deterioration determination value S decreases as the determination value correction amount E increases. As shown in FIG. 8, in the deterioration determination value correction control, the smaller that the degree of opening of the WGV 40 is, or the larger that the intake air amount of the engine is, the greater the degree to which the determination value correction amount E is increased and the deterioration determination value S is decreased. Note that, in the aforementioned correction control, for example, the determination value correction amount E is set by taking a state in which the WGV 40 is kept fully open and the intake air amount is a predetermined flow rate as a reference state. That is, the determination value correction amount E is set so as to be zero in the aforementioned reference state.

The following operational advantages can be obtained according to the above described deterioration determination value correction control. First, in an engine with a turbo, to avoid a situation in which a supercharging pressure becomes excessive, it is necessary to open the WGV 40 at an appropriate timing. If the need to open the WGV 40 arises in this manner, the ECU 60 forcibly opens the WGV 40, even during execution of the catalyst deterioration determination control. When the WGV 40 is opened, a measurement value of the oxygen storage capacity USC has a characteristic of increasing as the degree of opening of the WGV 40 decreases or the intake air amount increases. In this respect, according to the above described correction control, for example, if the measurement value deviates in an increasing direction relative to the reference state due to a change in the degree of opening of the WGV or the intake air amount, the deterioration determination value S is decreased so as to prevent an erroneous determination due to the measurement value that deviates in the increasing direction.

Accordingly, when measuring the oxygen storage capacity OSC, even when a change in the degree of opening of the WGV or a change in the intake air amount acts as a disturbance, the influence of these changes on the measurement value can be corrected by performing the correction control with respect to the deterioration determination value S. Thus, the oxygen storage capacity OSC can be stably measured under fixed conditions (a reference state), and a signal-to-noise ratio of the measurement value with respect to the disturbance can be improved. Therefore, in an approximately similar manner to the foregoing Embodiment 2, in an engine with a turbo also, deterioration of the catalyst 26 can be accurately determined and a decrease in the determination accuracy and an erroneous determination can be avoided.

[Specific Processing to Realize Embodiment 3]

Next, specific processing for implementing the above described control is described with reference to FIG. 10. FIG. 10 is a flowchart illustrating control that is executed by the ECU according to Embodiment 3 of the present invention. It is assumed that the routine shown in FIG. 10 is repeatedly executed during operation of the engine. According to the routine shown in FIG. 10, first, in step 300, similarly to Embodiment 1, the ECU 60 determines whether or not a need has arisen to perform a deterioration determination.

If a need to execute a deterioration determination has arisen, in step 302 the ECU 60 executes the catalyst deterioration determination control while executing the active air-fuel ratio control. Next, in step 304, similarly to the above described Embodiment 2, the ECU 60 reads in the degree of opening of the WGV 40 and the intake air amount. Subsequently, in step 306, the ECU 60 calculates the determination value correction amount E by referring to the data shown in the aforementioned FIG. 8 based on these values that are read. The ECU 60 then corrects the deterioration determination value S based on the determination value correction amount E.

Figure 10:
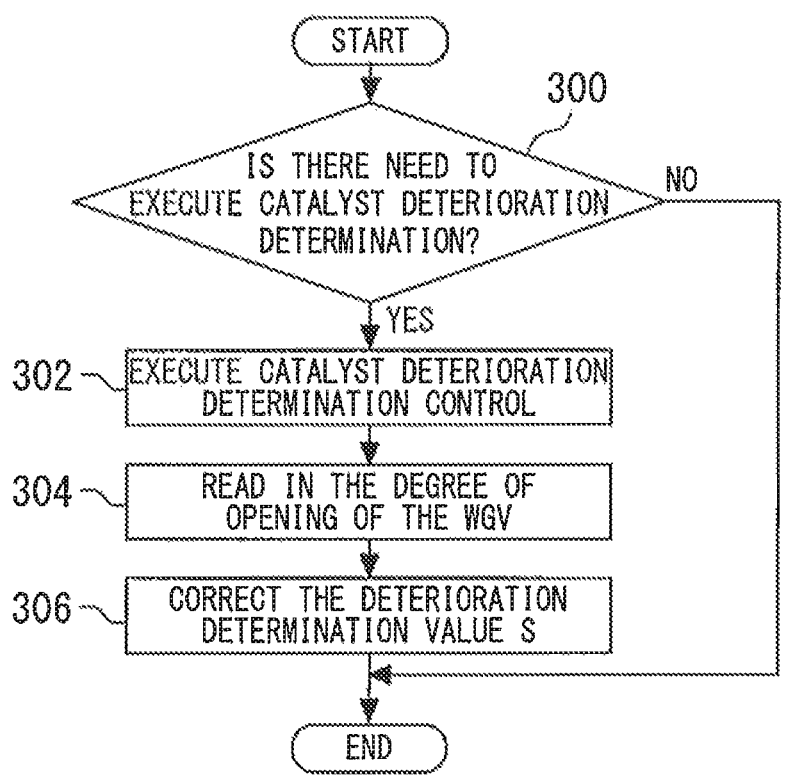
FIG. 10 is a flowchart illustrating control that is executed by the ECU according to Embodiment 3 of the present invention.

Note that, in the above described Embodiment 3, step 302 in FIG. 10 shows a specific example of active air-fuel ratio control means and deterioration determination means according to claim 4. Further, step 306 and FIG. 8 show a specific example of determination value correction means according to claims 4 and 5.

In Embodiments 2 and 3, examples are described in which an oscillation width of a target air-fuel ratio and a deterioration determination value are individually corrected. However, the present invention is not limited to these examples, and a configuration may also be adopted that combines Embodiments 2 and 3. That is, according to the present invention, a configuration may also be adopted that performs correction of an oscillation width of a target air-fuel ratio and correction of a deterioration determination value together.

In addition, in Embodiments 2 and 3, a state in which the WGV 40 is fully open is used as a reference state when correcting an oscillation width of a target air-fuel ratio and a deterioration determination value. However, the present invention is not limited thereto, and a state in which the WGV 40 is fully closed or a state in which the WGV 40 is maintained at a predetermined intermediate degree of opening may also be used as the reference state.

DESCRIPTION OF REFERENCE NUMERALS

10 engine (internal combustion engine), 12 piston, 14 combustion chamber, 16 crankshaft, intake passage, 20 exhaust passage, 22 throttle valve, 24 intercooler, 26 exhaust purification catalyst, 28 fuel injection valve, 30 spark plug, 32 intake valve, 34 exhaust valve, 36 turbo-supercharger, 36*a* turbine, 36*b* compressor, 38 bypass passage, 40 waste gate valve, 40*a* actuator, 50 crank angle sensor, 52 airflow sensor, 54 intake air pressure sensor, 56 air-fuel ratio sensor (air-fuel ratio detection means), 58 oxygen concentration sensor, 60 ECU, At target air-fuel ratio, Ar actual air-fuel ratio, S deterioration determination value

The invention claimed is:

1. A control apparatus for an internal combustion engine, comprising:
    an exhaust purification catalyst that is provided in an exhaust passage of the internal combustion engine and that has an oxygen storage capability;
    a turbo-supercharger that has a turbine that is provided in the exhaust passage on an upstream side of the exhaust purification catalyst, and that supercharges intake air utilizing an exhaust pressure;
    a bypass passage that branches from the exhaust passage on an upstream side of the turbine, and bypasses the turbine and merges with the exhaust passage on the upstream side of the exhaust purification catalyst;
    a waste gate valve that adjusts an amount of exhaust gas that flows through the bypass passage;
    air-fuel ratio detection unit that is arranged on a downstream side of a merging position where the exhaust passage and the bypass passage merge, and that detects an air-fuel ratio in a vicinity of the exhaust purification catalyst;
    active air-fuel ratio control unit that alternately changes a target air-fuel ratio to a rich side and a lean side around a theoretical air-fuel ratio, and controls an actual air-fuel ratio that is detected by the air-fuel ratio detection unit so that the actual air-fuel ratio matches the target air-fuel ratio;
    deterioration determination unit that measures an oxygen storage capacity of the exhaust purification catalyst based on the target air-fuel ratio and the actual air-fuel ratio in a state in which the actual air-fuel ratio is controlled by the active air-fuel ratio control unit, and determines deterioration of the exhaust purification catalyst by comparing a relevant measurement value of the oxygen storage capacity with a predetermined deterioration determination value; and
    amplitude correction unit that, when the deterioration determination unit determines the deterioration of the exhaust purification catalyst, corrects an oscillation width of the target air-fuel ratio around the theoretical air-fuel ratio based on a degree of opening of the waste gate valve.

2. The control apparatus for an internal combustion engine according to claim 1, wherein the amplitude correction unit is configured to decrease the oscillation width of the target air-fuel ratio as the degree of opening of the waste gate valve decreases.

3. A control apparatus for an internal combustion engine, comprising:
    an exhaust purification catalyst that is provided in an exhaust passage of the internal combustion engine and that has an oxygen storage capability;
    a turbo-supercharger that has a turbine that is provided in the exhaust passage on an upstream side of the exhaust purification catalyst, and that supercharges intake air utilizing an exhaust pressure;
    a bypass passage that branches from the exhaust passage on an upstream side of the turbine, and bypasses the turbine and merges with the exhaust passage on the upstream side of the exhaust purification catalyst;
    a waste gate valve that adjusts an amount of exhaust gas that flows through the bypass passage;
    air-fuel ratio detection unit that is arranged on a downstream side of a merging position where the exhaust passage and the bypass passage merge, and that detects an air-fuel ratio in a vicinity of the exhaust purification catalyst;

active air-fuel ratio control unit that alternately changes a target air-fuel ratio to a rich side and a lean side around a theoretical air-fuel ratio, and controls an actual air-fuel ratio that is detected by the air-fuel ratio detection unit so that the actual air-fuel ratio matches the target air-fuel ratio;

deterioration determination unit that measures an oxygen storage capacity of the exhaust purification catalyst based on the target air-fuel ratio and the actual air-fuel ratio in a state in which the actual air-fuel ratio is controlled by the active air-fuel ratio control unit, and determines deterioration of the exhaust purification catalyst by comparing a relevant measurement value of the oxygen storage capacity with a deterioration determination value; and determination value correction unit that, when the deterioration determination unit determines the deterioration of the exhaust purification catalyst, corrects the deterioration determination value based on a degree of opening of the waste gate valve.

4. The control apparatus for an internal combustion engine according to claim 3, wherein the determination value correction unit is configured to take a state that the waste gate valve is kept fully open as a reference state, and decrease the deterioration determination value as the degree of opening of the waste gate valve decreases from the reference state.

\* \* \* \* \*